(12) United States Patent
Anthony et al.

(10) Patent No.: US 8,817,352 B2
(45) Date of Patent: Aug. 26, 2014

(54) OPTICAL SWITCHING ASSEMBLY WITH OVER-CENTER LOCK

(75) Inventors: David G. Anthony, Marana, AZ (US); Robert Stein, Tucson, AZ (US)

(73) Assignee: Raytheon Company, Waltham, MA (US)

(*) Notice: Subject to any disclaimer, the term of this patent is extended or adjusted under 35 U.S.C. 154(b) by 12 days.

(21) Appl. No.: 13/603,827

(22) Filed: Sep. 5, 2012

(65) Prior Publication Data

US 2014/0063581 A1 Mar. 6, 2014

(51) Int. Cl.
*G02B 26/00* (2006.01)

(52) U.S. Cl.
USPC ............ 359/227; 359/230; 359/234; 359/236

(58) Field of Classification Search
USPC .................................................. 359/227, 234
See application file for complete search history.

(56) References Cited

U.S. PATENT DOCUMENTS

| 4,834,073 A | * | 5/1989 | Bledsoe et al. | 601/34 |
| 5,665,305 A | * | 9/1997 | Belliveau et al. | 362/268 |
| 2008/0304126 A1 | * | 12/2008 | Powell et al. | 359/234 |
| 2010/0283854 A1 | * | 11/2010 | McKaughan et al. | 348/144 |
| 2012/0038901 A1 | * | 2/2012 | McKaughan et al. | 356/4.01 |

* cited by examiner

*Primary Examiner* — Ricky Mack
*Assistant Examiner* — William Alexander
(74) *Attorney, Agent, or Firm* — Renner, Otto, Boisselle & Sklar, LLP

(57) ABSTRACT

An optical switching assembly having an optical path therethrough includes an optical element, a base frame, an optical support that supports the optical element and is pivotably mounted to the base frame, and a linkage. The linkage interconnects the base frame and the optical support to effect movement of the optical support between an aligned position where the optical element is in the optical path and a non-aligned position removed from the aligned position. The linkage has two over-center positions that respectively correspond to the aligned position and the non-aligned position. No additional energy is required to hold the linkage in the over-center positions.

19 Claims, 7 Drawing Sheets

OPTICAL SWITCHING ASSEMBLY WITH OVER-CENTER LOCK

This invention was made with United States Government support under Contract No. N68936-08-C-0034. The United States Government has certain rights in this invention.

FIELD OF THE INVENTION

The invention relates to optical systems, and in particular to a system and method for moving optical elements into and out of an optical path.

BACKGROUND OF THE INVENTION

Optical systems have a wide variety of applications, such as in cameras, telescopes, and other imaging devices that capture an image from a field of view and in projectors for projecting an image. In either case, the optical system guides, directs, or otherwise interacts with light traveling along an optical path through the optical system. Alignment of the optical components is important to provide the highest quality image possible.

SUMMARY OF THE INVENTION

The present invention is directed to an optical assembly and method for moving an optical element between an aligned position where it is aligned with an optical path and a non-aligned position removed from the aligned position, where in both positions no energy is required to maintain the optical element in position.

More particularly, the present invention provides an optical switching assembly having an optical path therethrough. The optical switching assembly includes an optical element, a base frame, an optical support that supports the optical element and is pivotably mounted to the base frame, and a linkage. The linkage interconnects the base frame and the optical support to effect movement of the optical support between an aligned position where the optical element is in the optical path and a non-aligned position removed from the aligned position. The linkage has two over-center positions that respectively correspond to the aligned position and the non-aligned position. A spring helps to hold the linkage in the over-center positions, but no additional energy is required to hold the linkage in the over-center positions.

Further features of the invention will become apparent from the following detailed description when considered with the drawings.

DETAILED DESCRIPTION

Figure 1:
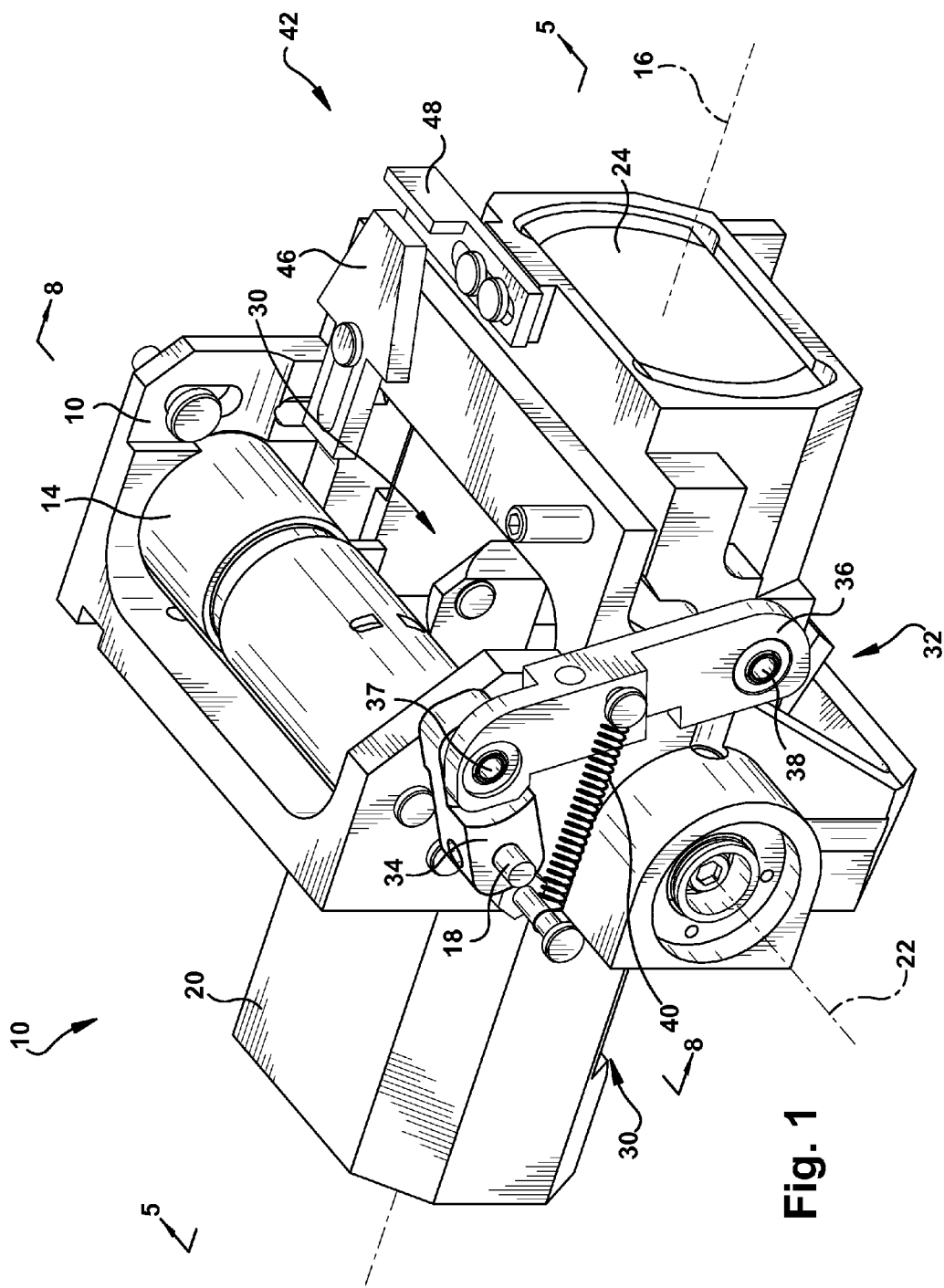
FIG. 1 is a perspective view of an optical assembly provided by the present invention, in an aligned position.
Figure 2:
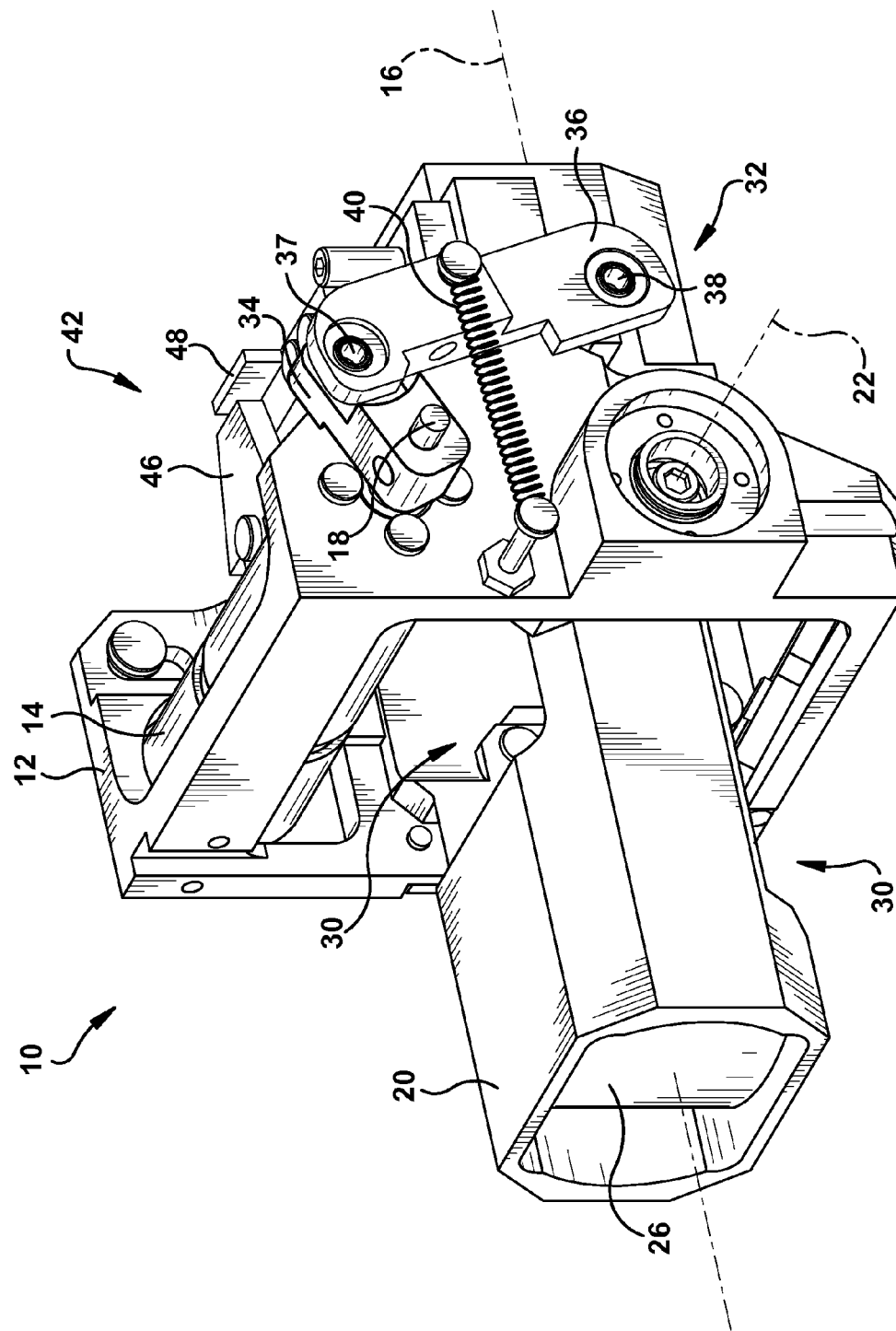
FIG. 2 is a rotated perspective view of the optical assembly of FIG. 1.
Figure 3:
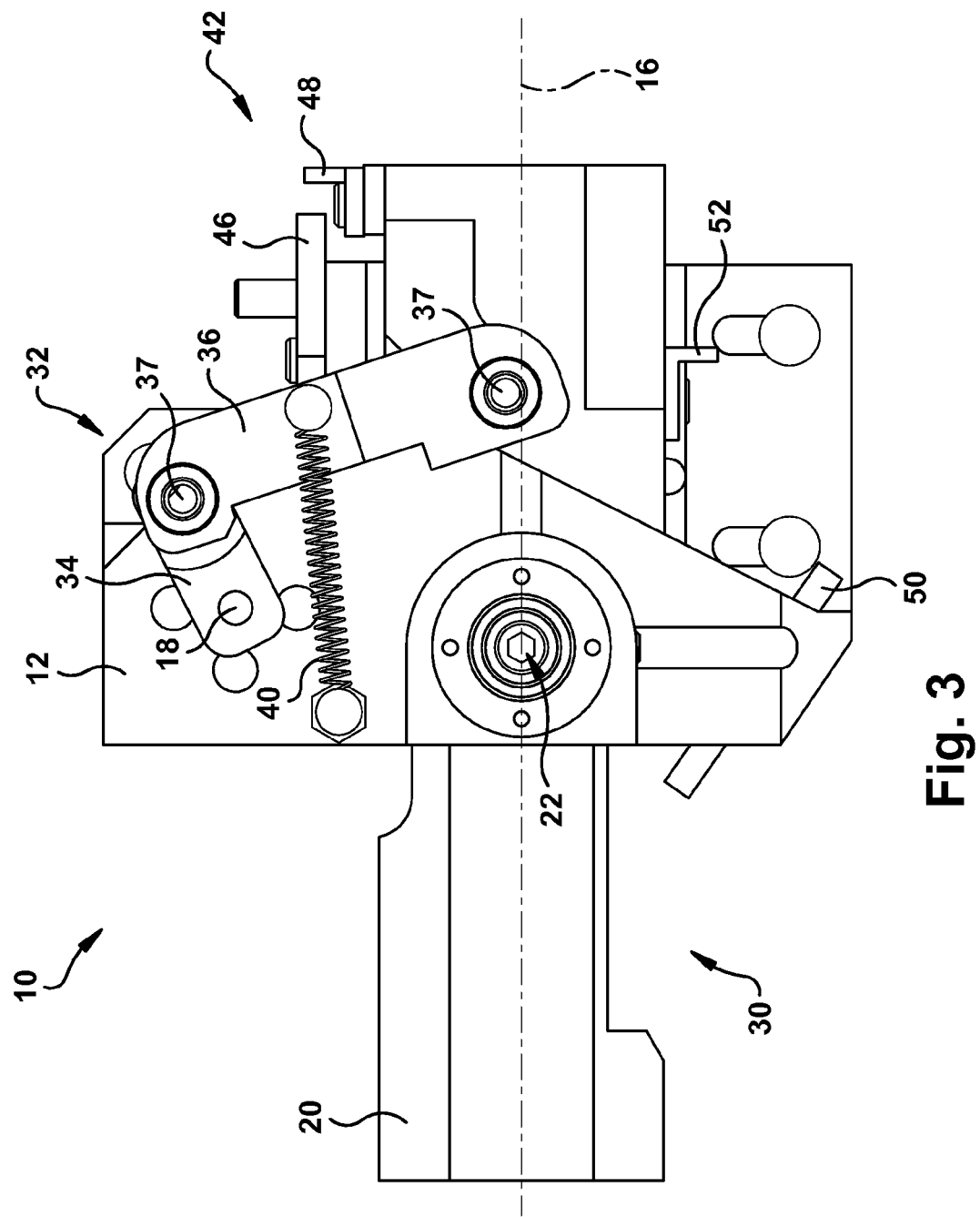
FIG. 3 is a side elevation view of the optical assembly of FIG. 1.

As noted above, the present invention is directed to an optical assembly and method for moving an optical element between an aligned position where it is aligned with an optical path and a non-aligned position removed from the aligned position, where in both positions no energy is required to maintain the optical element in its current position.

An exemplary optical assembly 10 provided in accordance with the present invention is shown in the drawings. Referring initially to FIGS. 1-5, the optical assembly 10 includes a base frame 12, and a motor 14, such as an electric motor, a solenoid, or other motive device, mounted to the base frame 12. In the illustrated optical assembly 10, the base frame 12 includes a passage for an optical path 16 through the optical assembly 10. The motor 14 has a drive shaft 18 that extends through one side of the base frame 12.

An optical support 20 also is pivotably mounted to the base frame 12 for rotational movement about a pivot axis 22 that typically is transverse the optical path 16. The optical support 20 provides a means for supporting one or more optical elements 24, such as lenses, filters, mirrors, or other means for interacting with light traveling along the optical path 16. The term "light" as used in connection with this invention is not limited to visible light, but is defined as electromagnetic radiation, and includes visible, infrared, ultraviolet, and other wavelengths of the electromagnetic spectrum. In the illustrated embodiment the optical support 20 has a generally tubular shape and includes two spaced-apart optical elements 24 and 26. The optical support 20 maintains the positions of the optical elements 24 and 26 relative to one another and to the optical path 16. The pivot axis 22 passes approximately through the longitudinal center of the optical support 20, between the optical elements 24 and 26.

The illustrated optical support 20 also includes a clearance hole or passage, which also may be referred to as a transverse passage 30. The clearance passage 30 extends along an axis transverse the pivot axis 22. The clearance passage 30 in the illustrated embodiment passes between the two optical elements 24 and 26, to allow light on the optical path 16 to pass through the optical support 20 when the optical elements 24 and 26 are rotated out of the optical path 16.

Figure 4:
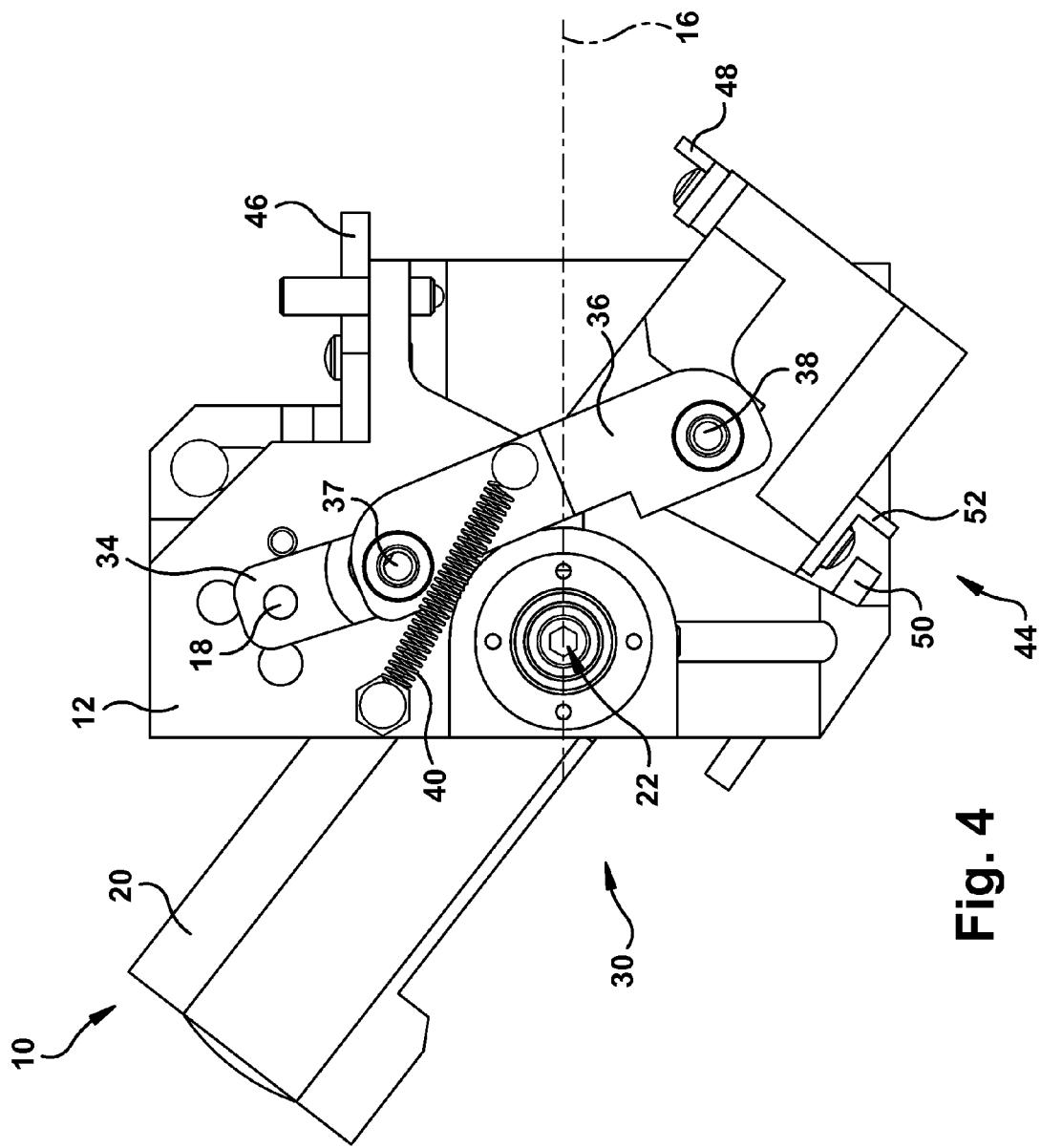
FIG. 4 is a side elevation view of the optical assembly of FIG. 1, in a non-aligned position.
Figure 5:
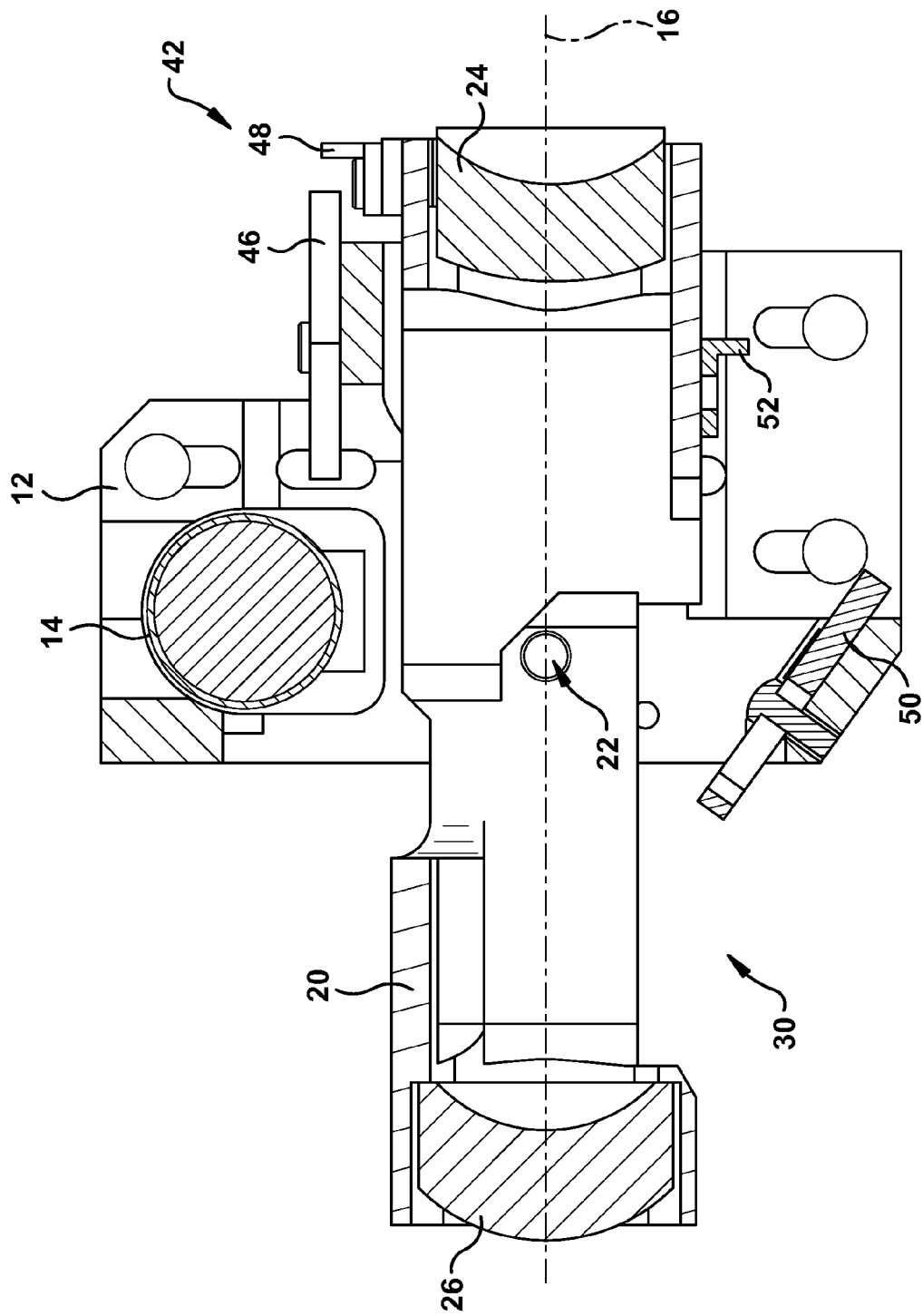
FIG. 5 is a longitudinal cross-sectional view of the optical assembly as seen along line 5-5 of FIG. 1.
Figure 6:
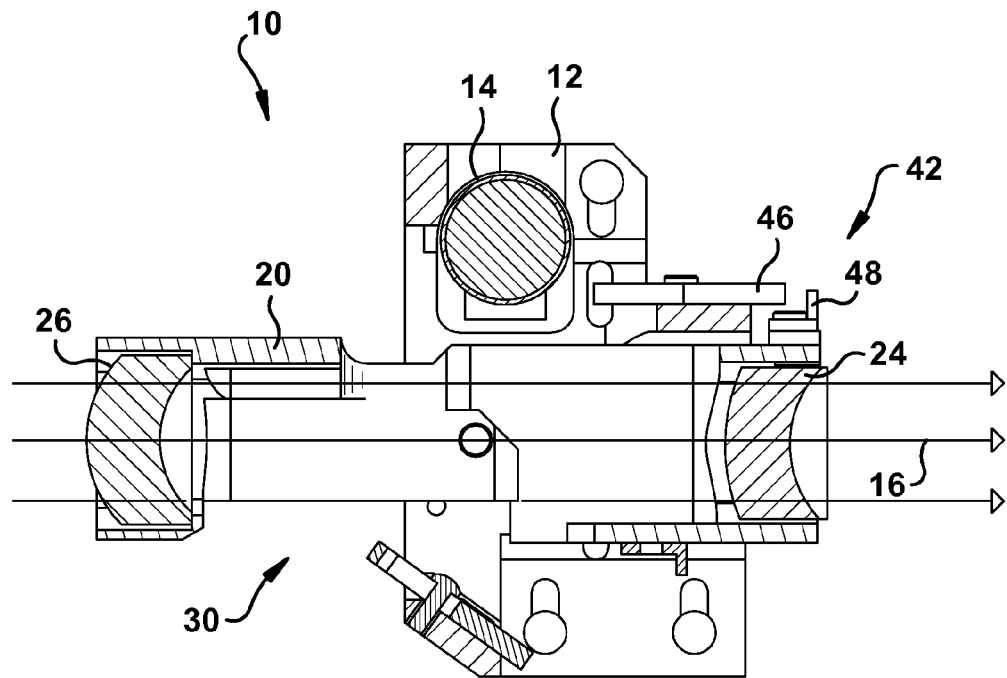
FIG. 6 is another longitudinal cross-sectional view of the optical assembly as seen along line 5-5 of FIG. 1.
Figure 7:
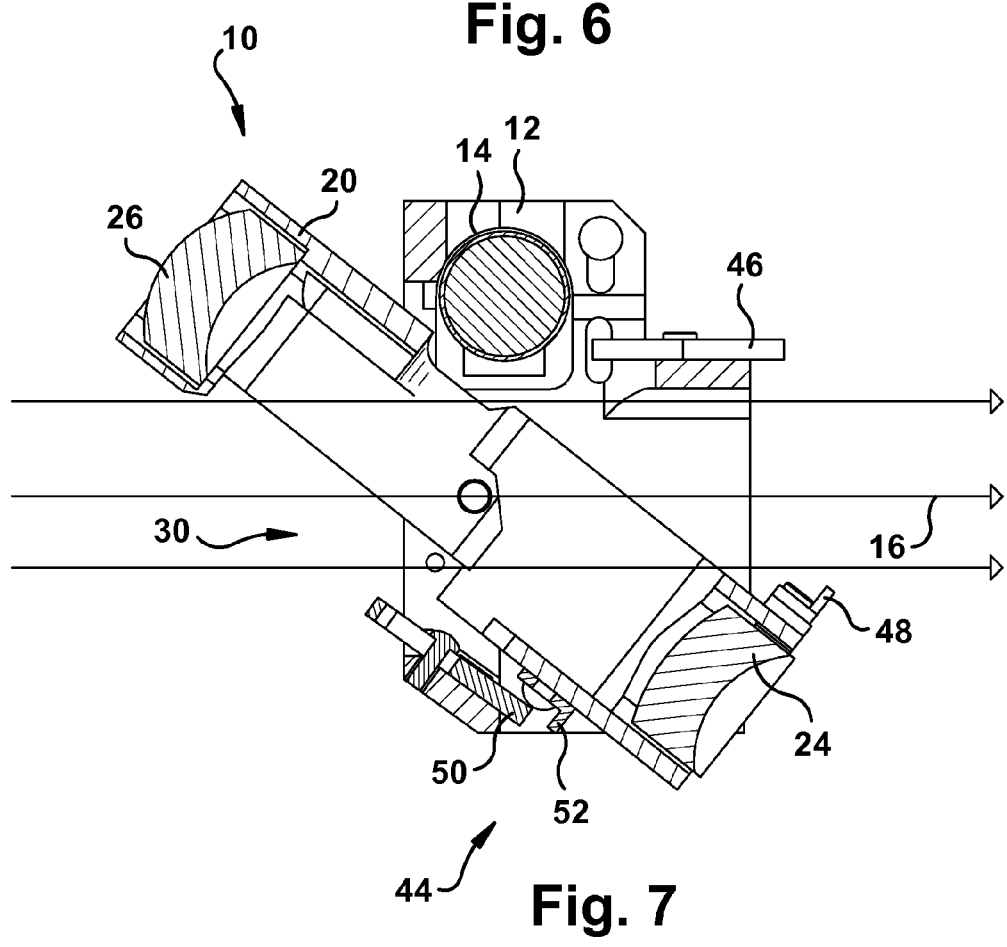
FIG. 7 is a longitudinal cross-sectional view of the optical assembly in the non-aligned position of FIG. 4 as seen along the same line as in FIGS. 5 and 6.

A linkage 32 interconnects the motor 14 and the optical support 20 to move the optical support 20 between an aligned position where the optical elements are in the optical path 16, as shown in FIG. 1, and a non-aligned position removed from the aligned position, as shown in FIG. 4. More particularly, the linkage 32 includes four links pivotably connected to one another in series. Specifically, the linkage 32 includes a rocker arm 34 connected to the motor drive shaft 18 for rotation about the drive shaft 18, and a connecting link or arm 36 rotatably connected to the rocker arm 34 at one end and to the optical support 20 at the other end via pivots 37 and 38, respectively. The optical support 20 acts as an output link, and the base frame 12 provides a ground link that completes the linkage loop for a four-bar linkage. The optical support 20 is rotatably or pivotally connected to the base frame 12 and the connecting link 36 for rotation about the pivot axis 22.

A spring 40 extending between the base frame 12 and the connecting link 36 helps to absorb vibration and keep the linkage 21 in both the non-aligned position (FIG. 4) and the aligned position. The spring 40 helps to keep the linkage locked over center. The spring load is chosen such that the motor torque can overcome the force generated by the spring.

An over-center linkage provides a mechanical stop position and prevents any backdriving of the linkage from that position. The spring 40 holds the linkage 32 against a stop so that vibration or freeplay in the linkage 32 will not cause the linkage 32 to move out of the over-center position. The spring 40 impacts the driving force for the linkage 32, as the spring force must be overcome to move the linkage 32 from the non-aligned position back toward the aligned position. Thus, selecting the spring force requires consideration of the tradeoff between the impact on the driving force and holding the linkage tightly against a stop.

The switching assembly 10 provided by the invention thus includes a pair of stops 42 and 44 that cooperate with the linkage 32 to provide means for limiting rotation of the optical support 20 or other means for supporting the optical elements 24 and 26. The stops 42 and 44 define the range of travel for the linkage 32. The stops 42 and 44 include an adjustable alignment stop 42 that defines the aligned position (FIG. 3) and an adjustable non-alignment stop 44 that defines the non-aligned position (FIG. 4). The alignment stop 42 has two cooperating components, including a longitudinally-adjustable stop member 46 mounted to the base frame 12, and a laterally-adjustable stop member 48 mounted to the optical support 20. By changing the relative positions of the longitudinally-adjustable stop member 46 and the laterally-adjustable stop member 48, the optical support 20, and thus the optical elements 24 and 26 can be aligned with the optical path 16 in the aligned position.

Similarly, the non-alignment stop 44 includes a longitudinally-adjustable stop member 50 mounted to the base frame 12 and a laterally-adjustable stop member 52 mounted to the optical support 20. The longitudinally-adjustable stop members 46 and 50 are movable to change the amount of rotation that the optical support 20 can move through, as well as to align the optical elements 24 and 26 along the optical path 16, by moving toward or away from the laterally-adjustable stop members 48 and 52. The laterally-adjustable stop members 48 and 52 are adjustable side-to-side to align with an engage the respective longitudinally-adjustable stop member 46 and 50. In the drawings, the adjustable stop members 46, 48, 50, and 52 are not shown in contact with their respective counterpart, but in practice they generally would be in engagement in the respective aligned or non-aligned position.

A linkage with over-center stops at both ends of the range of travel are referred to as double over-center linkages. The double over-center linkage effectively locks (secures in a given state) and unlocks (releases from its current state) automatically upon rotation of the motor drive shaft 18. Over-center stabilization relies on the relative position of the links, their mass, and friction to automatically secure the linkage 32 against changing position from an over-center state corresponding to the aligned and non-aligned positions. No energy is required to hold the linkage 32 in its over-center positions other than what is provided by the spring 40.

In moving to an over-center position, the motor 14 or other drive mechanism moves the linkage 32 such that the spring 40 moves from a more-stressed condition to a less-stressed condition. In the illustrated embodiment, the spring 40 is always in a stressed condition to some extent, meaning that the spring 40 is stretched beyond its resting length and is applying some force on the linkage 32 at all times. The over-center position also can be described as the position at which the motion of the linkage 32 toward the respective stop 42 or 44 is helped by the restorative nature of the spring 40 rather than in opposition to the spring 40, as it is while in transition from one over-center position to the other.

In the four-bar type of linkage 32 formed by the optical support 20, the connecting arm 36, and the rocker arm 34, with the base frame 12, the over-center positions can further be defined as follows. In the alignment over-center position (FIG. 3), the included angle between the rocker arm 34 and the connecting arm 36 is less than ninety degrees. Consequently, even when no power is provided to the motor 14, which drives the rocker arm 34, a force applied to the rocker arm 34 through the connecting arm 36 will have a harder time rotating the rocker arm 34 out of the alignment over-center position shown due to inertia, friction, and the mass of the various components in the linkage 32. A similar arrangement can be found in FIG. 4, which illustrates the non-aligned over-center position. Here the included angle between the optical support 20 (operating along a line from the pivot axis 22 to the pivoting connection point with the connecting arm 36) and the connecting arm 36 is less than ninety degrees, and the angle between the rocker arm 34 and the connecting arm 36 are nearly one-hundred-eighty degrees, all of which makes it difficult for a force applied through the connecting arm 36 to rotate the optical support 20 out of its non-aligned position.

An over-center state is relatively stable. If the motor 14 applies a counter-clockwise torque to the rocker arm 34, the rocker arm 34 will rotate the connecting link 36, and thus the optical support 20, into the aligned position shown in FIG. 3. Since the point where the connecting link 36 is pivotably attached to the rocker arm 34 has traveled past the axis of the motor drive shaft 18 to form an acute inclusive angle, the linkage 32 will tend to maintain the optical support 20 against the stop 42 and maintain the optical elements 24 and 26 in their aligned position. The stop 42 will block any additional counter-clockwise movements about the pivot axis 22 and the angle between the rocker arm 34 and the connecting arm 36 makes it difficult to move the optical support 20 out of the aligned position. No power is needed from the motor 14 to hold the linkage 32 in the aligned position. If a clockwise torque is applied to the optical support 20, the linkage 32 will tend to remain in the aligned position. Since no motive devices are directly connected to the optical support 20, vibration and movement of a vehicle within which the optical assembly 10 is mounted are the most likely sources of force on the optical support 20. The spring 40 and the over-center positions are sufficient to hold the linkage 32 and the optical support 20 in place.

Similarly, if the motor 14 applies a clockwise torque to the rocker arm 34, the rocker arm 34 will rotate the connecting link 36, and thus the optical support 20, into the non-aligned position shown in FIG. 4. Now the rocker arm 34 and the connecting arm 36 are nearly aligned, or in a center position, and the optical support 20 and the connecting arm 36 form an acute angle therebetween, and the linkage 32 will tend to maintain the optical support 20 against the stop 44 and maintain the optical elements 24 and 26 in their non-aligned position. The stop 44 will block any additional clockwise movements about the pivot axis 22 and the angle between the optical support 20 and the connecting arm 36 makes it difficult to move the optical support 20 out of the non-aligned position. No power is needed from the motor 14 to hold the linkage 32 in the aligned position. If a clockwise torque is applied to the optical support 20, the linkage 32 will tend to remain in the non-aligned position. Thus the linkage will prevent inadvertent movement without requiring any energy inputs to maintain the over-center position, whether in the aligned position or the non-aligned position. It is the motor 14 and the linkage 32 that cooperate to provide the means for effecting rotation of the optical support 20 between the aligned position and the non-aligned position.

Figure 8:
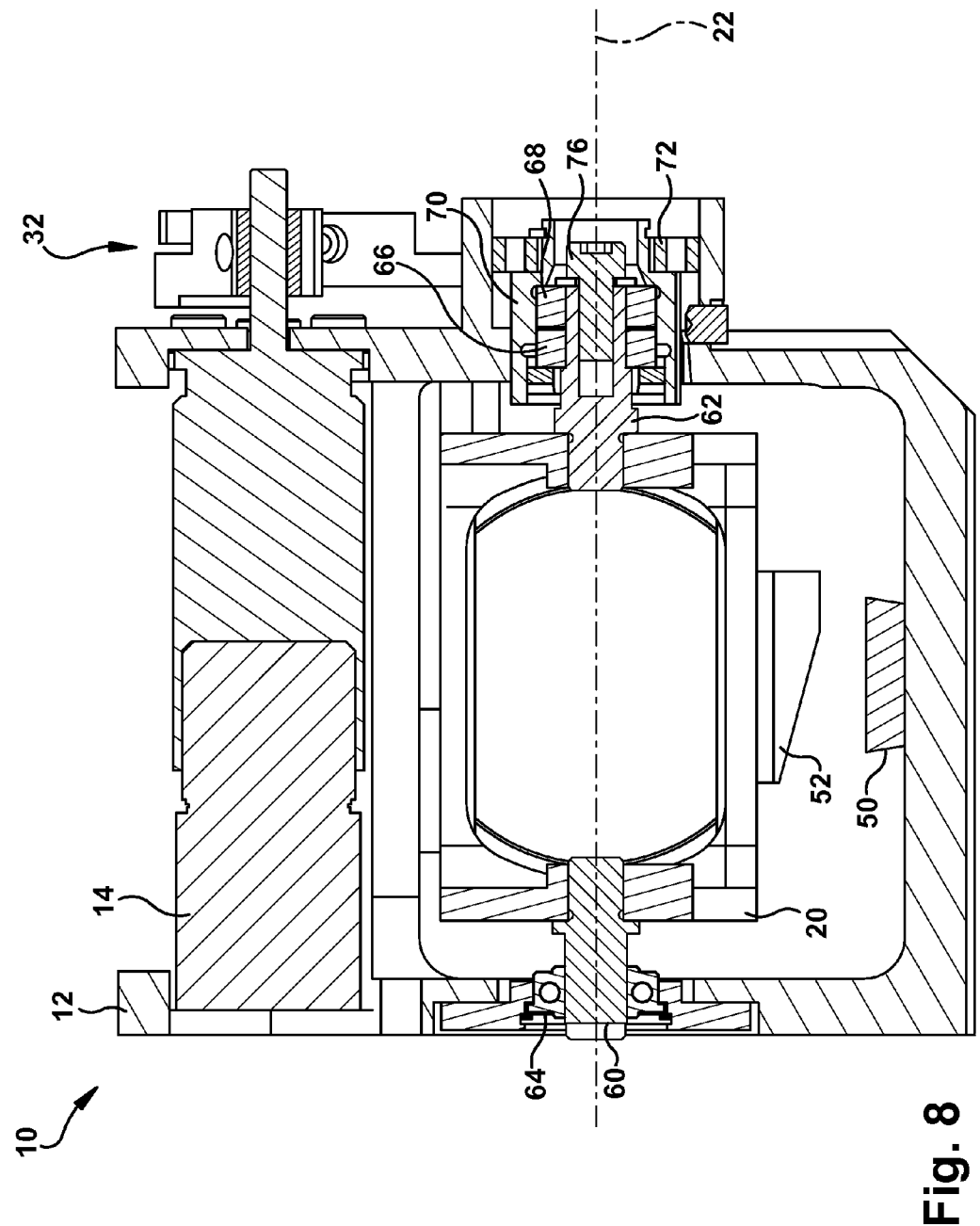
FIG. 8 is a transverse cross-sectional view of the optical assembly as seen along line 8-8 of FIG. 1.

As shown in FIG. 8, the optical support 20 also is laterally adjustable relative to the base frame 12 along the pivot axis 22. To that end, the optical support 20 is pivotally mounted to the base frame 12 with threaded posts 60 and 62 that are adjustably threaded into a flange bearing 64 supported in the base frame 12 on one side and a pair of bearings 66 and 68 mounted inside a trunion 70 secured to the base frame 12 on an opposite side. A threaded ring 72 provides for linear adjustment of the trunion 70 relative to the base frame 12, and a set screw 74 locks the trunion 70 in the desired position. The illustrated embodiment further includes a preload screw 76 for adjusting the amount of friction between the threaded post and the pair of bearings 66 and 68, thereby preloading the tension in the rotation of the optical support 20, which further limits inadvertent movement of the optical support 20, such as from vibration.

The optical assembly 10 provided by the present invention thus enables moving an optical element 24, 26 between an aligned position (FIG. 3) where it is aligned with an optical path 16 and a non-aligned position (FIG. 4) removed from the aligned position, where in both positions no energy is required to maintain the optical element 24, 26 in position. The optical assembly 10 further includes movable stops 42 and 44 that are adjustable, and provide precise and repeatable positioning of the optical elements 24 and 26 in both the aligned and non-aligned positions.

In summary, the present invention provides an optical switching assembly 10 having an optical path 16 therethrough. The optical switching assembly 10 includes an optical element 24, a base frame 12, an optical support 20 that supports the optical element 24 and is pivotally mounted to the base frame 12, and a linkage 32. The linkage 32 interconnects the base frame 12 and the optical support 20 to effect movement of the optical support 20 between an aligned position where the optical element 24 is in the optical path 16 and a non-aligned position removed from the aligned position. The linkage 32 has two over-center positions that respectively correspond to the aligned position and the non-aligned position. No additional energy is required to hold the linkage 32 in the over-center positions. If power to the switching assembly 10 is lost, no energy is needed or consumed in maintaining the optical support 20 in its over-center position.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An optical switching assembly having an optical path therethrough, comprising:
a base frame;
an optical element;
an optical support that supports the optical element and is pivotably mounted to the base frame; and
a linkage interconnecting the base frame and the optical support to effect movement of the optical support between an aligned position where the optical element is in the optical path and a non-aligned position removed from the aligned position, the linkage having two over-center positions that respectively correspond to the aligned position and the non-aligned position where no additional energy is required to hold the linkage in the over-center positions.

2. An optical switching assembly as set forth in claim 1, where the linkage includes three movable arms pivotably connected in series, and in the over-center positions one arm of the linkage engages a stop that prevents further rotation of that arm, that arm forming an inclusive acute angle with an adjacent movable arm.

3. An optical switching assembly as set forth in claim 1, where the linkage is a four-bar linkage having a pivotable rocker arm (i) connected to a motor mounted to the base frame, a connecting arm (ii) pivotally connected to the rocker arm and the optical support at spaced-apart pivots, and the optical support (iii), which is pivotally connected to the base frame (iv) at a location removed from where the rocker arm is attached to the base frame.

4. An optical switching assembly as set forth in claim 1, further comprising a stop connected to the base frame that limits rotation of the optical support relative to the base frame.

5. An optical switching assembly as set forth in claim 4, where the stop is adjustable to selectably limit rotation of the optical support relative to the base frame.

6. An optical switching assembly as set forth in claim 5, where the stop further comprises an adjustable stop member attached to one of the optical support and the base frame and configured to interfere with the other of the optical support and the base frame when the optical support pivots a predetermined amount relative to the base frame.

7. An optical switching assembly as set forth in claim 1, comprising a motive device mounted to the base frame, the motive device being connected to the linkage to effect movement of the linkage and the optical support between the aligned position and the non-aligned position.

8. An optical switching assembly as set forth in claim 7, where the motive device includes an electric motor.

9. An optical switching assembly as set forth in claim 1, where the optical support includes a pair of optical elements, and a pivot axis for the optical support lies between the optical elements.

10. An optical switching assembly as set forth in claim 1, where the pivot axis is near a center of the optical support.

11. An optical switching assembly as set forth in claim 1, where the optical support has a transverse clearance hole that defines a passage through the optical support for the passage of the optical path through the optical support when the optical support is in the non-aligned position.

12. An optical switching assembly as set forth in claim 1, where the optical support is laterally adjustable relative to the base frame.

13. An optical switching assembly as set forth in claim 3, further comprising a spring, which is attached to the base frame at one end and to the linkage at the other end.

14. An optical switching assembly as set forth in claim 13, where the other end of the spring is attached near a center of the connecting arm.

15. An optical switching assembly as set forth in claim 13, where the spring biases the linkage into the aligned position when the linkage is in the aligned position and biases the linkage into the non-aligned position when the linkage is in the non-aligned position.

16. An optical switching assembly having an optical path therethrough, comprising:
   a base frame;
   means for interacting with light on the optical path;
   means for supporting the interacting means relative to the base frame in an aligned position where the interacting means is aligned with the optical path and a non-aligned position where the interacting means is removed from the aligned position, the supporting means being pivotably mounted to the base frame for rotation relative to the base frame;
   means for limiting rotation of the supporting means;
   means for effecting rotation of the supporting means between the aligned position and the non-aligned position, the effecting means including a linkage having over-center positions at the aligned position and the non-aligned position whereby no energy is needed to hold the supporting means in either position.

17. An optical switching assembly as set forth in claim 16, where the interacting means includes an optical element that includes a lens.

18. An optical switching assembly as set forth in claim 17, where the effecting means includes a motive device coupled to the linkage to control movement of the supporting means.

19. An optical switching assembly as set forth in claim 1, further comprising:
   a stop connected to the base frame that limits rotation of the optical support relative to the base frame;
   a motive device mounted to the base frame, the motive device being connected to the linkage to effect movement of the linkage and the optical support between the aligned position and the non-aligned position; and
   a spring configured to bias the linkage to remain in the aligned position when the linkage is in the aligned position and to bias the linkage to remain in the non-aligned position when the linkage is in the non-aligned position;
   where the linkage is a four-bar linkage having a pivotable rocker arm connected to the motive device, which is mounted to the base frame, a connecting arm pivotally connected to the rocker arm and the optical support at spaced-apart pivots, and the optical support, which is pivotally connected to the base frame at a location removed from where the rocker arm is connected to the base frame;
   where the optical support includes a pair of optical elements, and a pivot axis for the optical support lies between the optical elements is near a center of the optical support;
   where the optical support has a transverse clearance hole that defines a passage through the optical support for the passage of the optical path through the optical support when the optical support is in the non-aligned position; and
   where the optical support is laterally adjustable relative to the base frame.

* * * * *